Figure 11:
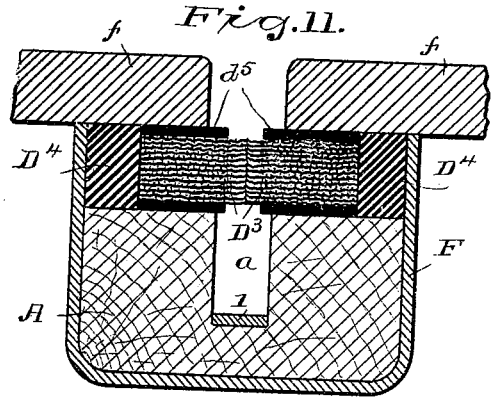

(No Model.) 6 Sheets—Sheet 1.
C. J. VAN DEPOELE.
CLOSED CONDUIT FOR ELECTRIC CONDUCTORS.
No. 434,410. Patented Aug. 12, 1890.
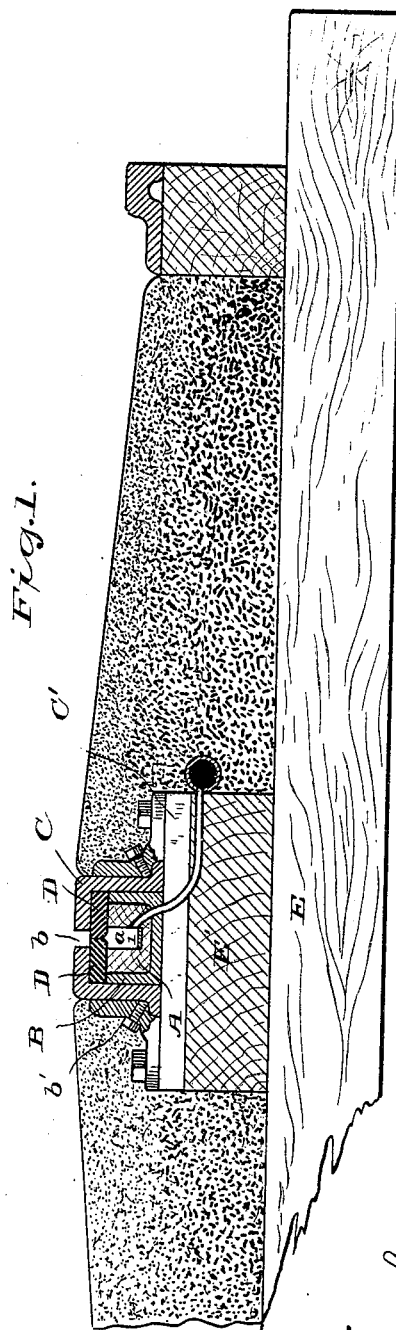
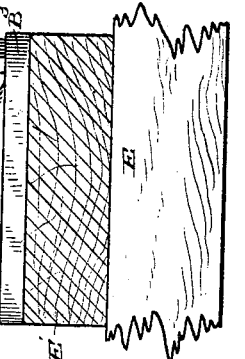
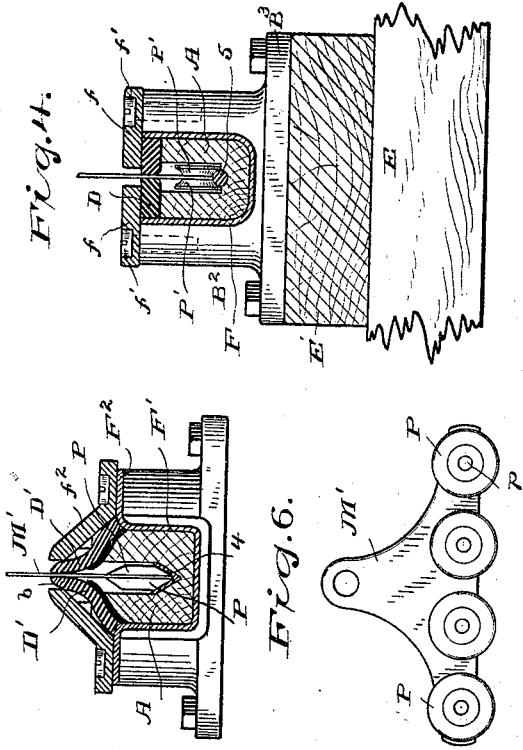
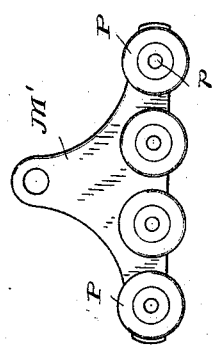
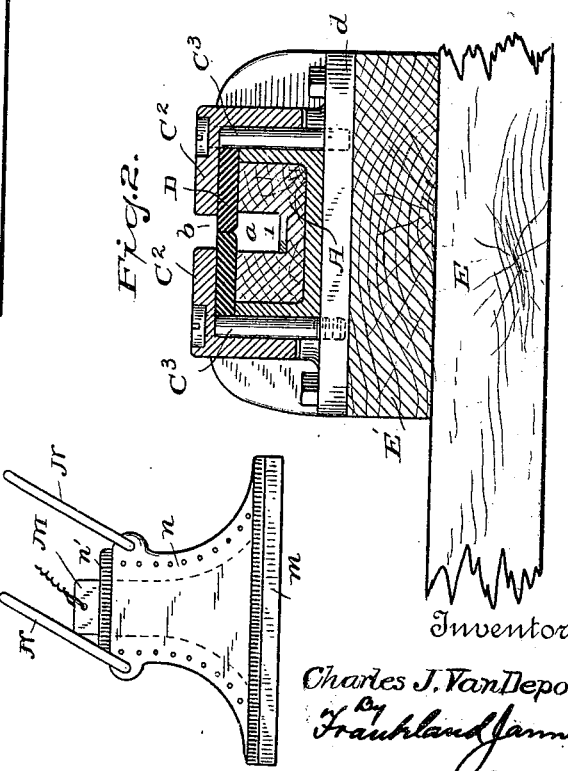
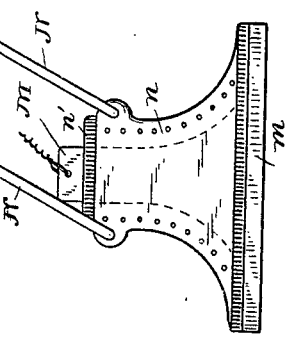
Witnesses
H. A. Lamb
C. L. Sturtevant
Inventor
Charles J. VanDepoele
by Frankland Jannus
Attorney (No Model.)  C. J. VAN DEPOELE.  6 Sheets—Sheet 2.
CLOSED CONDUIT FOR ELECTRIC CONDUCTORS.
No. 434,410. Patented Aug. 12, 1890.
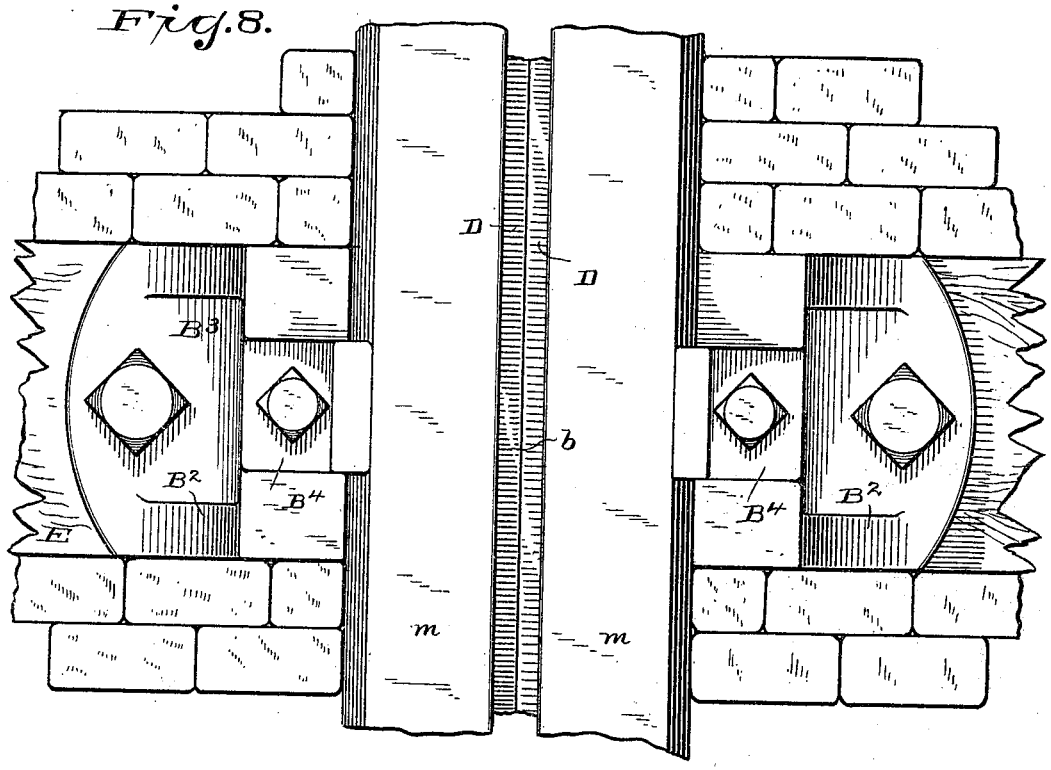
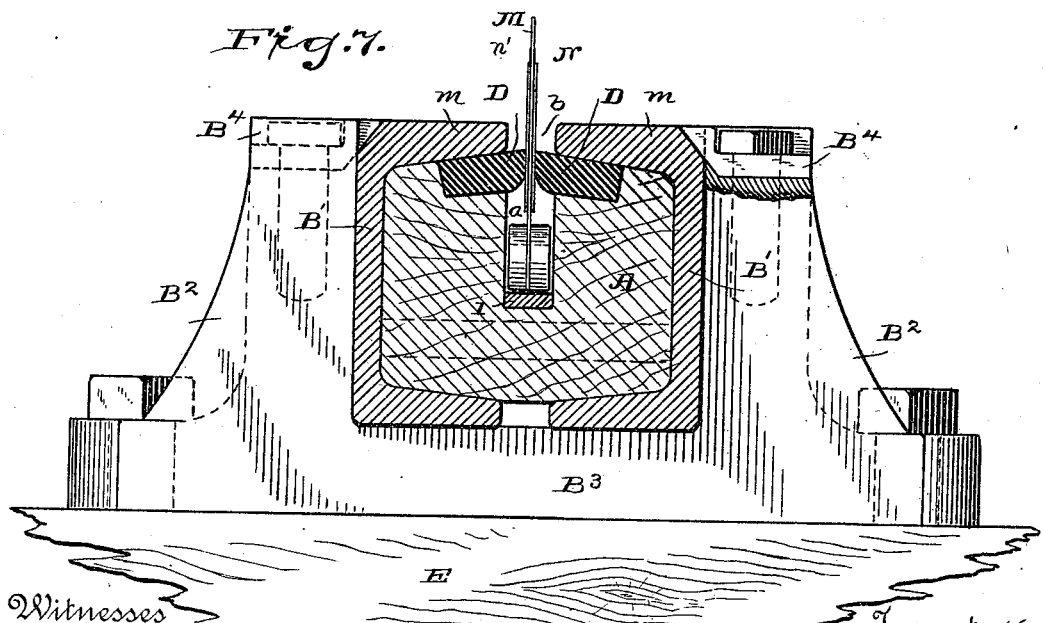

(No Model.)  6 Sheets—Sheet 3.
C. J. VAN DEPOELE.
CLOSED CONDUIT FOR ELECTRIC CONDUCTORS.
No. 434,410. Patented Aug. 12, 1890.
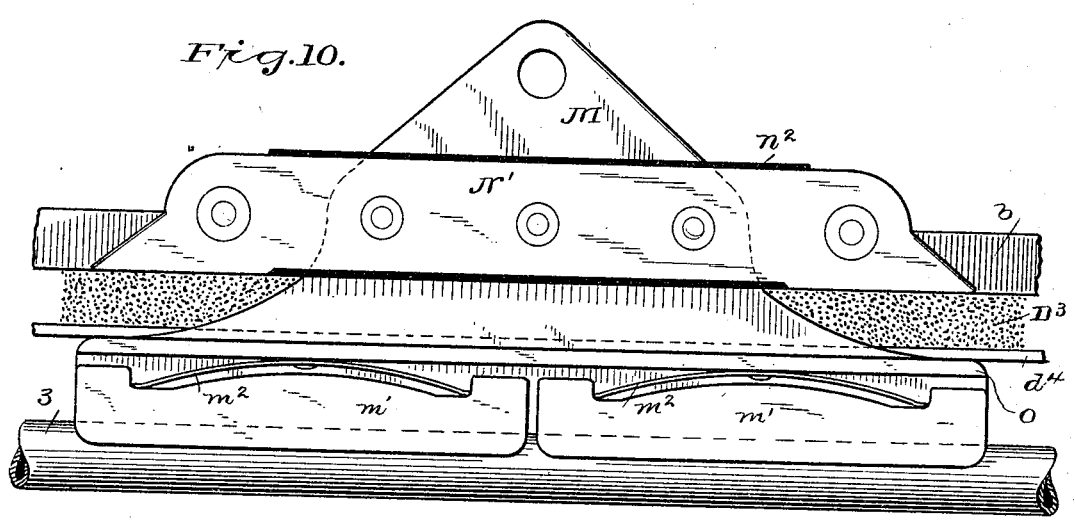
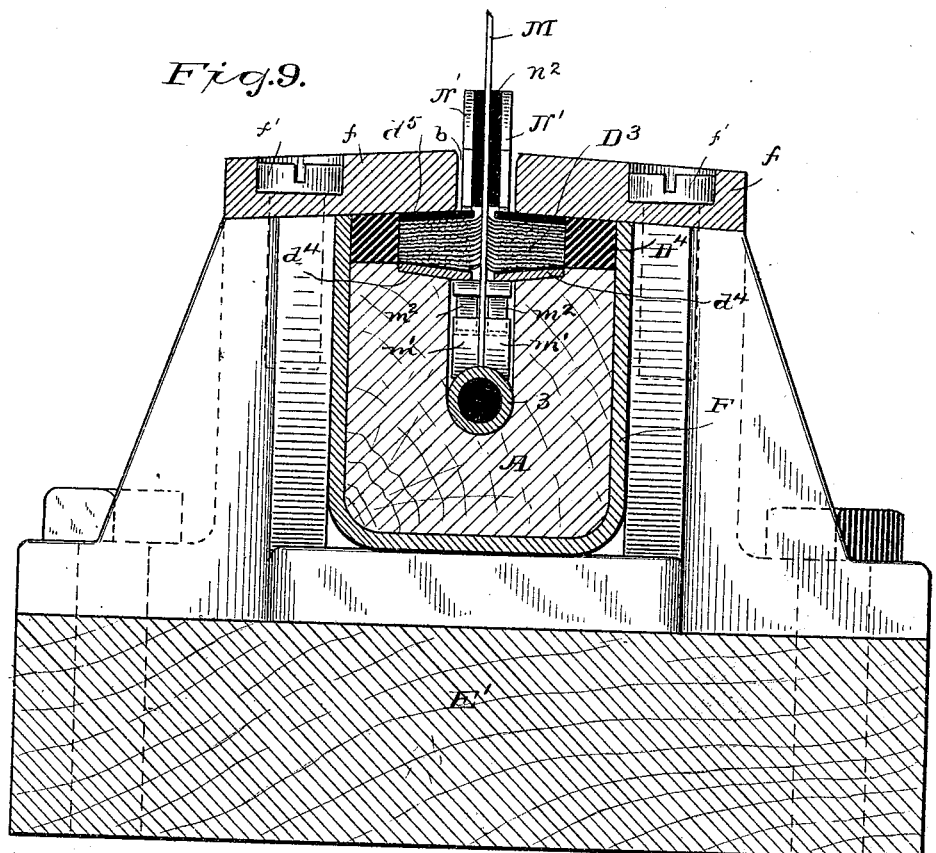
Witnesses
H. A. Lawly
C. L. Sturtevant
Inventor
Charles J. Van Depoele
By Frankland Jarvis
Attorney (No Model.)

C. J. VAN DEPOELE.
CLOSED CONDUIT FOR ELECTRIC CONDUCTORS.

No. 434,410. Patented Aug. 12, 1890.

Witnesses
H. A. Lawl
C. S. Sturtevant

Inventor
Charles J. Van Depoele
By Frankland Jannus
Attorney (No Model.) 6 Sheets—Sheet 5.
C. J. VAN DEPOELE.
CLOSED CONDUIT FOR ELECTRIC CONDUCTORS.
No. 434,410. Patented Aug. 12, 1890.

Witnesses
H. A. Lamb
C. S. Sturtevant

Inventor
Charles J. Van Depoele
By Frankland Jannus,
Attorney (No Model.)  
C. J. VAN DEPOELE.  
CLOSED CONDUIT FOR ELECTRIC CONDUCTORS.  
6 Sheets—Sheet 6.
No. 434,410. Patented Aug. 12, 1890.
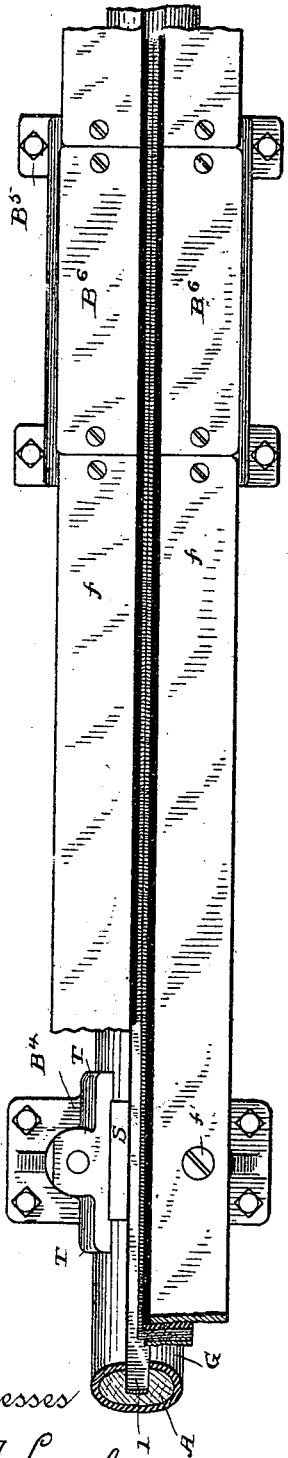
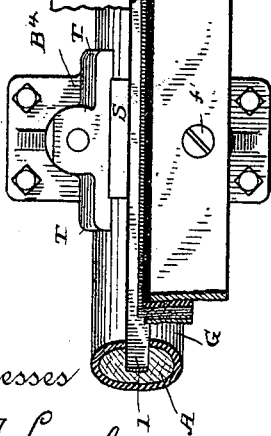
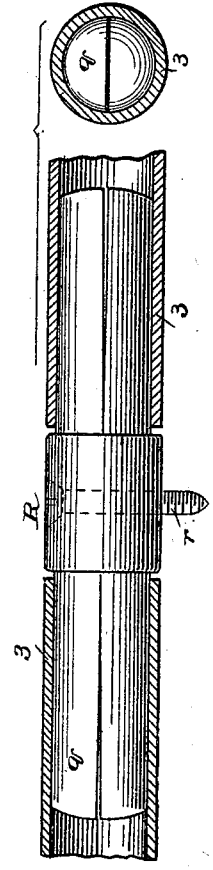
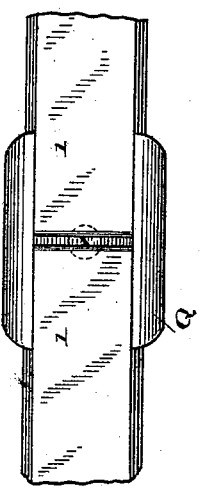
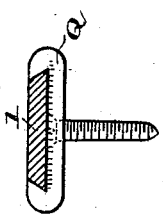
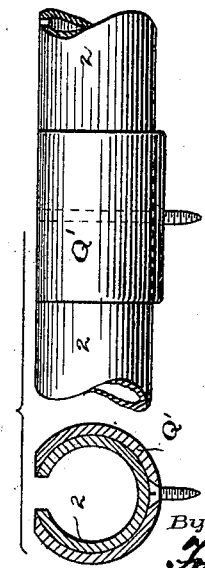
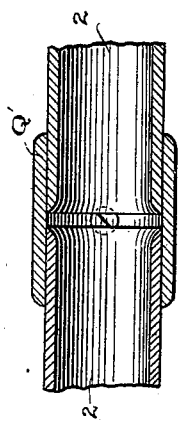
Witnesses  
H. H. Lamb  
C. L. Sturtevant
Inventor  
Charles J. Van Depoele  
By Frankland Jannus.  
Attorney

UNITED STATES PATENT OFFICE.

CHARLES J. VAN DEPOELE, OF LYNN, MASSACHUSETTS.

CLOSED CONDUIT FOR ELECTRIC CONDUCTORS.

SPECIFICATION forming part of Letters Patent No. 434,410, dated August 12, 1890.

Application filed January 5, 1889. Serial No. 295,506. (No model.)

*To all whom it may concern:*

Be it known that I, CHARLES J. VAN DE-POELE, a citizen of the United States, residing at Lynn, in the county of Essex and State of Massachusetts, have invented certain new and useful Improvements in Closed Slotted Conduits for Electric Conductors; and I do hereby declare the following to be a full, clear, and exact description of the invention, such as will enable others skilled in the art to which it appertains to make and use the same.

My invention relates to improved means for supporting, protecting, and insulating a supply conductor or conductors for electric railways or analogous use; and it consists, broadly, in an improved form of sub-surface conduit in which the supply-conductor is carried, traveling contact being made with said conductor by a metallic contact device extending through a continuous surface-slot formed in the exterior casing of the conduit, which said slot is kept normally closed by elastic water-proof strips secured under each edge thereof and pressed together, so as to exclude water, dirt, stones, and the like. Said strips on account of their nature, form, and position are capable of being sufficiently separated by the traveling plow to admit of its passage without at the same time permitting water or other objectionable matter to enter the conduit.

Two principal difficulties have hitherto attended the construction of sub-surface conduits for electric railway and other supply-conductors where such conductors were required to be directly accessible—viz., the difficulty of keeping the slot clear from obstructions and at the same time preventing the entrance of dirt and other objectionable matter, and particularly the maintenance of satisfactory insulation between the conductor, its protective casing, and the surrounding earth. Conduits as heretofore constructed have in almost all cases been of considerable internal capacity, rarely less than one square foot in size, the object in many cases being to provide a space or chamber below the bare conductor or conductors for the reception of dirt, storm-water, &c., which were then conveyed away by suitable outlets. By my present invention the conditions are greatly altered, the actual space between which the bare conductor is supported being in most instances merely a groove of, say, one inch in width and three inches in depth, in the bottom of which the conductor is placed. Such a groove would readily fill with water; but to prevent this I provide a flexible water-proof packing which is located below, and in some instances also between, the surface or capping plates of the conduit, and is arranged to fit closely together, so that little if any water would percolate through the meeting line of the opposing strips of packing. Water being thus excluded from the conductor-containing groove, solid substances will find it impossible to enter. I employ in connection with a conduit so constructed a traveling contact, which in its travel separates the elastic slot-closing material, the portion entering the conduit being nothing more than a thin metal plate, which serves as the conductor for the electric current, and is so exceedingly small in cross-section that it does not open the packing anywhere except at the point when it is passing, so that water would not be able to effect an entrance except in minute quantities, which can be drained off through suitable outlets and connections. Furthermore, the said elastic packing forms and constitutes of itself an admirable and effective insulation between the conductor-containing groove and the exterior metal portions of the conduit, and even were the conductor-containing groove filled with water very little or no current could leak by passing through to the outside.

My invention may be carried out in a great variety of ways, several specific forms of conduit and of material available for the particular character of slot-closing media being shown in the accompanying drawings.

The present invention is an improvement upon that shown, described, and claimed in my prior patent, No. 347,905, dated August 24, 1886.

I am aware that the idea of closing a surface slot to protect the interior of a sub-surface conduit is not broadly new; but so far as I am aware it has never been proposed to apply flexible water-proof insulating material located below or between the actual metallic wearing-surface of the conduit for this purpose, and I therefore claim the same broadly.

in connection with the various specific forms hereinafter referred to.

Various details of construction and arrangement will be hereinafter referred to in connection with the accompanying drawings, in which—

Figure 1 is a transverse sectional elevation showing part of the road-bed of an electric railway and a form of conduit embodying my invention. Fig. 2 is a transverse sectional elevation showing a slightly different form of conduit, together with its immediate supports. Fig. 3 is a detail view in elevation showing a contact-plow adapted for use in connection with the conduit seen in Figs. 1 and 2. Fig. 4 is a transverse view in elevation, partly in section, showing a form of conduit. Fig. 5 is a view similar to Fig. 4, embodying a slightly-different construction. Fig. 6 is a side elevation of another form of contact-plow. Fig. 7 is a transverse elevation, partly in section, showing another form of conduit-casing. Fig. 8 is a plan view showing the conduit and one of the supporting-chairs in place. Fig. 9 is a transverse elevation, partly in section, showing a somewhat different construction of conduit and packing. Fig. 10 is a side elevation showing the upper portion of one side of the conduit, conductor, and traveling contact seen in Fig. 9. Figs. 11, 12, 13, 14, 15, 16, 17, 18, 19, and 20 are detail views showing the conduit or upper parts thereof in transverse section and illustrating different forms of slot-closing packing. Fig. 21 is a plan view, broken away in parts, and illustrating the method of making water-tight expansible joints between the various sections of which the conduit is composed, and also a trap for permitting access to the interior of the conduit. Fig. 22 shows in side elevation and end view, respectively, means for electrically connecting one form of conductor used. Fig. 23 is a sectional view of the connections shown in Fig. 22. Fig. 24 shows in sectional elevation and end view another form of conductor-connection that may be used. Fig. 25 is a plan view of the connection by which flat conductors are united. Fig. 26 is a transverse section of the connections shown in Fig. 25.

As indicated in the drawings, my improved conduit comprises an exterior metallic body or casing which may be formed, as indicated in Figs. 1, 2, 7, and 8, of separate continuously-united sections of channel-iron, within which is inclosed the continuously-connected conductor-supporting filling or lining A, of wood or other insulating material, formed at its upper side with a channel or groove $a$, to receive the bare conductor 1, of copper or other suitable metal. In Fig. 1 a grooved wooden strip A is laid in a trough shaped iron casing B. The casing B is continuously connected, as will appear, and is enveloped on either side by similarly-continuous bars of Z-shaped angle-iron C, which extend along the sides of the trough B and inward over its upper edges. The inner edges of the surface-bars or capping-plates C are separated above the groove $a$ to form the continuous surface-slot $b$, through which the the contact devices enter the groove $a$. The bars C are supported upon suitable chairs C', placed at convenient distances along the line of the conduit. Before the bars C are secured in position continuous strips of elastic non-conducting packing D are laid horizontally along the upper edges of the groove $a$, upon the wood A, with their inner edges in contact, when they are secured in position and the parts firmly united by securing the angle-irons C firmly in their supporting-chairs, as, for example, by set-screws which pass through the chairs and press against the lower parts of the angle-irons C in a downwardly-oblique direction, so as to force said angle-irons closely against the sides of the trough B and at the same time firmly secure the packing-strips D D in position with their edges in close and practically water-tight contact.

As seen in Fig. 2, the angle-irons $C^2$ are L-shaped instead of Z-shaped, as in the previous instance, and are held in place by vertical screw-bolts $C^3$, passing downwardly and into a transverse iron plate $d$, forming the base of the chair by which the conduit is supported at intervals. The conduit as a whole being but four or five inches in height, if built directly upon the cross-ties E would not ordinarily extend as high as it is desirable to have the surface of the roadway between the tracks in order to drain surface-water away from the conduit, and I therefore find it convenient in construction to place the conduit-supporting chairs upon a continuous wooden stringer E', placed longitudinally upon the cross-ties and appropriately secured thereto. A further advantage of the use of the stringer E' consists in the fact that the conduit being supported thereby the cross-ties E may be removed or replaced without in any way disturbing the conduit structure.

As seen in Fig. 7, the grooved wooden bar A is formed with additional rabbets or recesses along its upper edges for the reception of the elastic packing D D and is incased or inclosed by two trough or U shaped iron bars B' B', placed edgewise and forced upon the wood A, so as to inclose it and the packing D D tightly, the wood with its casing of iron being then placed between the upright arms $B^2 B^2$ of the chair $B^3$ by which the conduit is supported. Removable plates $B^4$ are bolted down on top of the arms $B^2 B^2$, with their inner edges projecting over the corners of the iron casing B' B', so as to hold it firmly in position, the exposed upper sides of said casing forming the surface or capping plates of the conduit. This construction is extremely simple and strong and has the advantage that when the upper surfaces of the casing B' B' become worn they can be removed from the central wooden portion A and reversed.

With the angle-iron casing just described the conduit can readily be constructed from standard materials; but it is in many cases desirable to use a special form of metallic exterior protection. For example, as seen in Fig. 4, the insulating grooved conductor-support A is completely inclosed within a metallic trough F, which is made high enough at the sides to also contain the horizontal packing-strips D D. The trough F is contained within a metallic chair $B^3$, and is secured in position by continuous removable capping-plates $f\,f$, which are separated to form the surface slot $b$, and are firmly secured to the upper parts of the arms $B^2\,B^2$ of the chair by suitable bolts $f'$, and while acting to protect the said packing-strips and the interior of the conduit the plates $f$ also compress the strips D D into close edge contact with each other and hold them firmly in that position.

A form differing slightly from the above is shown in Fig. 5, in which the trough F' is made somewhat shallower than the trough F, and has its upper edges $F^2$ bent outwardly, so as to rest upon the upper ends of the arms $B^2\,B^2$ of the chair. In this instance the capping-plates $f^2$ are inclined upwardly and the packing-strips D' D' arranged to extend upwardly and to make an oblique instead of a horizontal contact. This form is especially desirable where the roadway between the tracks is paved with asphalt, since the covering can then be brought up to the upper edges of the upwardly-inclined capping-plates $f^2$ and a very small surface thereof be exposed to wear.

The construction seen in Fig. 9 does not vary materially from that seen in Fig. 4, except in the details of the slot-closing packing, as will appear.

As seen in the various figures above referred to, the conduit may be constructed with several pieces of angle-iron secured about a continuous wooden strip or bar the size of ordinary scantling to form a metallic case, protected and closed at its top edges by the necessary surface or capping plates, which must be quite heavy to stand the wear and tear of traffic. In all instances where wood is employed it is to be thoroughly soaked, saturated, or coated with preservative compound for rendering it impervious to water and preventing decay. I do not, however, confine myself to the use of wood as a conductor supporting and insulating medium, since a tube or trough of any desired shape may be employed, said tube or trough being provided with an insulating lining, which lining may itself form the support for the conductor, as seen in Fig. 19.

Figure 19:
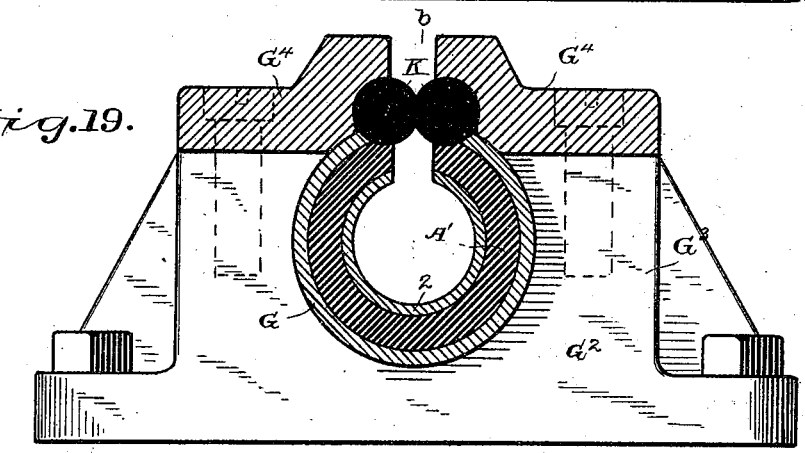

In Fig. 19 the conductor 2 is in the form of a slotted tube of less diameter than a slotted inclosing and protecting tube G, the space between the conductor and protecting tubes being filled with some plastic insulating material A' while in a liquid state—as, for example, bitumen. The tube G is supported at desired intervals by chairs $G^2$, which are provided with upwardly-extending arms or parts $G^3$, upon the upper surface of which are secured surface-plates $G^4$, separated to form a continuous narrow slot centrally above the slot in the tube G and its insulated lining. The bars $G^4$ are desirably undercut at their under edges to admit of the insertion of continuous strips of cylindric or other form of packing K by which the opening into the tube G is normally closed.

Figure 18:
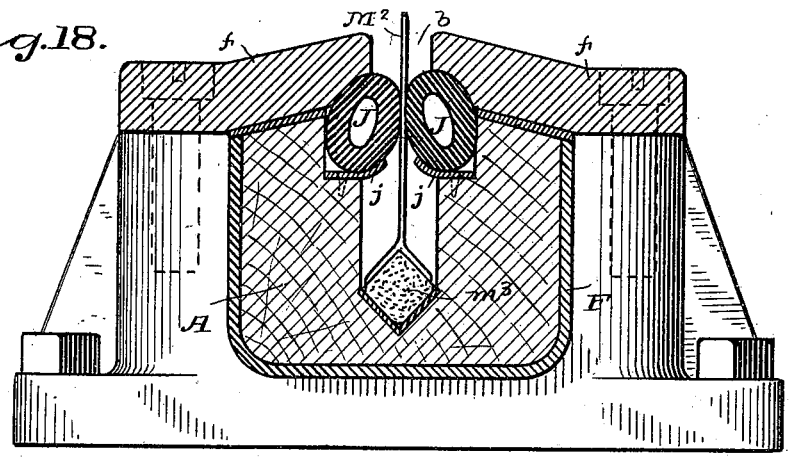

The form seen in Fig. 18 does not differ materially from that seen in Fig. 9, except as to the shape of the conductor and slot-closing devices, which are hollow rubber tubes J in place of the solid forms seen in other figures.

Figure 20:
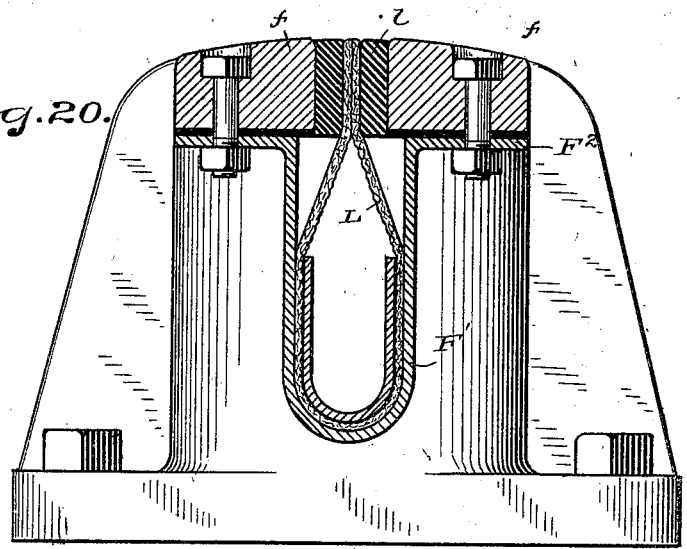

The conduit seen in Fig. 20 resembles that seen in Fig. 4, except that the U-shaped protecting metallic casing has its upper edges turned outwardly, as at F' $F^2$ in Fig. 5, and is finished with flat horizontal surface-plates $f\,f$, as in Fig. 4. The U-shaped casing is completely lined with canvas L or other strong durable fabric properly coated with insulating material and joined to the packing, thus forming a continuous closed chamber, in the lower part of which the conductor is placed.

The parallel strips of elastic packing by which the surface-slot of my improved conduit is closed and the water excluded may be composed of a great variety of materials within the limits of the principal requirements—elasticity, freedom from abrasion by the passing contact-plow between their adjacent edges, freedom from injury by water, and good insulating properties—since the said packing must not only exclude water, but also serves as insulation or additional insulation between the interior of the conduit and the surface-plates and casing. The additional insulation provided by the slot-closing strips also enables me to use a bare insulated contact device of extremely small cross-section without danger of loss of current by leakage or grounding through the metallic casing of the conduit, and this I claim broadly as a separate feature of invention. In many cases flat strips of pure rubber alone may be utilized for this purpose, which form is indicated at D D, in Figs. 1, 2, 4, 5, 7, and 8. This form of packing is unexcelled for insulating and water-proofing qualities, and when molded in strips of the proper size having smoothly-finished inner edges, which may be lubricated by a coating of dry plumbago, will give excellent results. Rubber being, however, comparatively very expensive, I propose to use as a substitute therefor various combinations of other materials, which I find well suited to the purpose.

Figure 15:
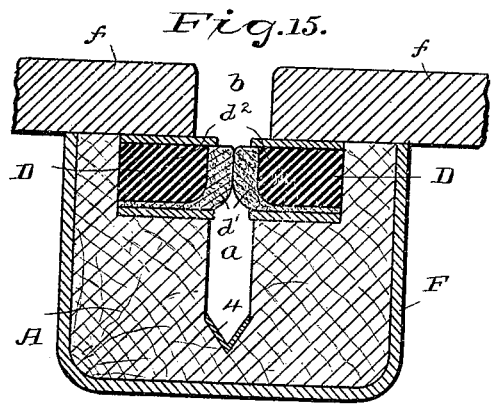
Figure 16:
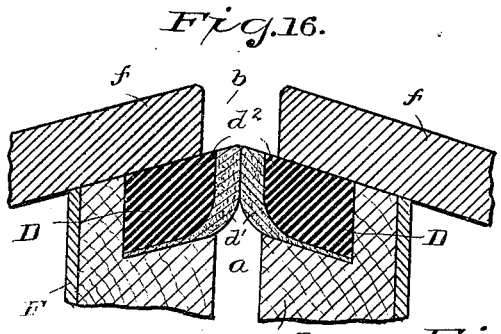
Figure 17:
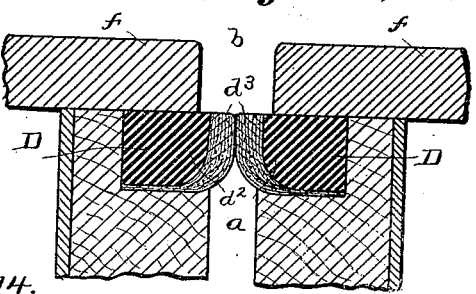
Figure 14:
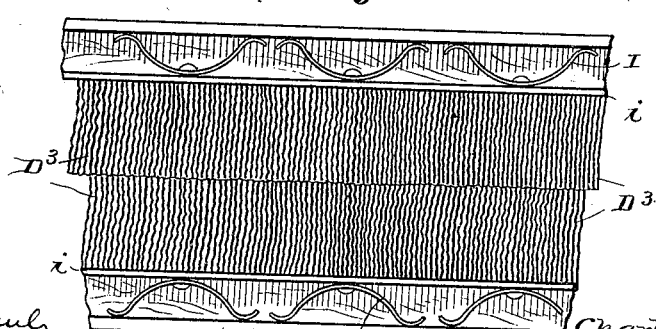

A very desirable form of packing is composed of strips $d^2$, formed of rubber D, with a facing $d'$ of leather, as seen in Figs. 15 and 16, or of canvas $d^3$, as in Fig. 17. With this form the rubber supplies the necessary flexibility and elasticity, and the leather or canvas facing increased durability. The leather or canvas should be secured to the rubber by an impervious cement, after which the facing can be thoroughly lubricated with an undrying oil mixed with plumbago, or with the former or latter alone. The oil will also prevent the leather being affected by moisture.

In Fig. 9 are seen packing-strips $D^3$, built up of a number of thicknesses of any strong fabric—as canvas, cotton duck, or similar material—said layers being thoroughly impregnated with water-proof insulating compound and laid upon and supported by metallic strips $d^4$, attached to the upper edges of the grooves in the wood A and acting to protect the under sides of the said strips from abrasion by the contact device. Upon the upper side of these strips are placed protecting-strips $d^5$ of good insulating material—such, for example, as vulcanized fiber. Strips of rubber $D^4$ are also used in connection with this fibrous packing, the rubber strips being placed in rear thereof, so as to force their inner edges together, at the same time permitting them to yield, if necessary, on the passage of the contact devices. The fibers at the inner edges of the strips $D^3$ should be unraveled to form a continuous brush, which will possess considerable elasticity and also hold lubricating material, which at the same time will act to render the said inner edges proof against the action of water.

Figure 12:
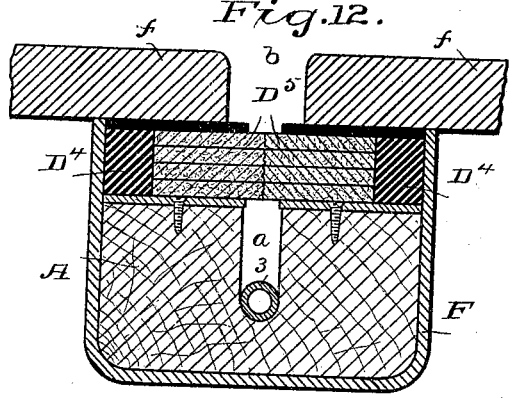
Figure 13:
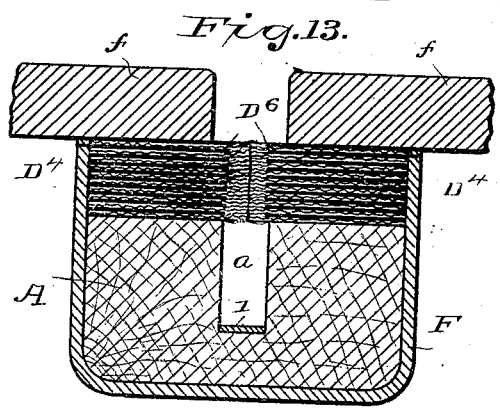

Different forms of fibrous packing, backed by rubber acting to impart the necessary lateral pressure and elasticity, are seen in Figs. 11, 12, and 13.

In Fig. 11 the built-up fibrous strips $D^3$ are sustained between upper and lower facings $d^5$ of hard insulating material, to which the fibrous material of the strips $D^3$ may be united by cement, sewing, or otherwise. The adjacent edges of the strips $D^3$ are held tightly together by rubber springs $D^4$, located in rear thereof.

In Fig. 12 packing-strips $D^5$ are seen, which said strips are formed of a number of layers of leather secured together and having their inner edges slitted or roughened to impart flexibility thereto. Additional elasticity is in this case also secured by means of the rubber backing-springs $D^4$.

In Fig. 13 is represented packing-strips $D^6$, composed of alternating layers of rubber and fabric, the rubber not extending quite to the inner adjacent edges. The fabric and rubber are securely united, as by stitching or cement, and the rubber will add to the strength and durability of the strip when completed, as its presence will counteract the tendency of the fabric to ravel, except at the edges where it is left free for that purpose. In this form of strip the rubber and fabric are so combined that the rubber will impart sufficient elasticity to the strips as a whole without being exposed to the wear of the passing traveler. The said strips are built up of alternate layers of rubber $d^6$ and fabric $d^7$, the laminæ of rubber extending not quite to the edge of the fabric, so that the inner edge of the fabric may become raveled to form a brush. This brush should be thoroughly lubricated with plumbago or some other material that will not affect the rubber, and if tightly pressed together in the first instance will form a very good means for closing the slot, which will be at the same time inexpensive and durable. Instead of the rubber packing $D^4$, (shown in the several figures as a means for forcing the slot-closing material together,) I may use flat steel springs I, acting against the inner sides of the casing of the conduit and against a continuous wooden or metallic strip $i$, located in rear of the fibrous packing-strips. The said packing-strips possessing some elasticity in themselves will yield enough to close about the front and rear of the contact-plow and thus exclude water.

As seen in Fig. 18, a conduit of the kind described is provided with a packing consisting of two rubber tubes J, pressed and held together by their position between the wood A and the under sides of the capping-plates $f f$. The tubes J may be secured in position by metallic strips J, having upturned inner edges, or the said tubes may be held in place by suitable adhesive material.

In Fig. 19 is seen a slot-closing device comprising two hempen or other ropes K, desirably of the woven variety. The said ropes are held in undercut recesses in the wood A and cap-plates $G^4$, and are thoroughly coated with tallow and plumbago or other suitable substance which will fill all the interstices and permit them to be pressed together to form a closed slot.

In Fig. 20 is seen a canvas lining L within the conduit and enveloping the conductor, the upper edges of said lining being brought up to the surface and cemented or otherwise attached to continuous rubber strips $l$, which strips are secured directly to the capping-plates $f f$. The inner surfaces of the edges of the canvas may also be provided with a strip or facing of leather, with which form the rubber, canvas, and leather should be attached and connected by some insoluble cement, after which the faces of the leather may be lubricated without fear of injuring the rubber.

Many different forms of conductor may be used with my improved conduit, some of which are herein illustrated.

As seen in Figs. 1, 2, 7, 11, 13, and 21, the main supply-conductor 1 is formed of a flat strip of metal, which may be of copper, or iron faced with copper or other good conducting metal. In connection with the flat conductor I may use a contact device similar to that shown in Fig. 3, in which is represented a plate or bar M of conducting metal secured to or provided at its lower edge with a rubbing shoe or shoes $m$ for actual contact with the surface of the conductor. Wheels or brushes may be substituted for the rubbing-shoe, but I find the latter desirable in many instances on account of its cheapness and durability, and the fact that a rubbing contact is in many instances preferable. The shoe m is removable so that by replacing the shoes when worn the traveling contact may last indefinitely.

As seen in Fig. 3, the vertically-extending part of the traveling contact comprises a plate or strip of conducting metal M, which may be in the form of a steel blade made as thin as consistent with the desired strength. To the lower edge of this blade is secured the shoe m referred to, and to its upper portion the links N or other devices by which it is mechanically connected to the moving vehicle. Said blade may, however, be inclosed within an outer protective casing n, between which and the conducting-plate M mica or other thin insulating material $n'$ may be interposed; but this is not essential, since the vertical portion M of the traveler moving at all times between the insulating slot-closing strips will be effectually insulated from the metallic casing of the conduit. The additional insulation and outer covering may, however, be useful in places where the conduit passes along a macadamized road or elsewhere where stones, sand, water, and other injurious substances would be likely to lodge in the slot and wear or injure the traveler. Under these conditions the exterior protection to the traveler would be more for mechanical than electrical reasons. This form of traveler is also seen in Fig. 7.

It will suffice in many instances to provide an exterior protection to that part of the traveling contact which is exposed above the insulating slot-closing packing. Such a form is seen in Figs. 9 and 10, where that portion of the conducting-plate M extending above the slot-closing packing-strips $D^3$ is provided with insulation $n^2$ and exterior protective plates N', which project in front and rear of the plate M, and are solidly united and sloped off at their ends to form plows traveling in the slot between the capping-plates for the purpose of removing stones or other obstructions that might have lodged therein. In said Figs. 9 and 10 a cylindric conductor 3 is seen, which may, if desired, be tubular in structure. To the lower edge of the plate M is secured a narrow strip of metal O, which enters the conduit and presses upward against the under sides of the plates $d^4$, upon which the packing shown in said figures is desirably supported, said strip O also contributing to close the narrow opening between the packing-strips caused by the passage of the plate M. Two or more rubbing-shoes $m'$ are arranged below the strip O with their under surfaces resting upon the conductor 3, with the form of which they will of course correspond, whether the same be round or flat or any other shape. The shoes $m'$ are connected to the strip O by flexible metallic springs $m^2$, secured to the under side thereof and sprung into suitable recesses in said shoes.

As indicated in Figs. 5, 15, and 18, a V-shaped conductor 4 may be employed, and it will also be understood that the traveling contact devices hereinbefore described may be utilized in connection therewith by suitably shaping the contact-shoes to conform to the shape of the conductor. I may, however, use a contact device such as shown in Fig. 6, which consists of a thin metallic conducting and supporting plate M', which is long enough to extend above the surface of the conduit for attachment to the connections between it and the traveling vehicle. Along the lower edge of the plate M' are secured saucer-shaped metallic disks P, which when united by a central bolt $p$ will form a hollow contact-wheel adapted to run in the grooved conductor. Any desired number of these disks may be provided so as to insure good electrical connection, and the supporting-plate M' is made narrower along its lower end portions in order that it may possess the lateral flexibility necessary to permit the carriage passing easily and smoothly along grooved or bent portions of the conduit.

A carriage similar to the foregoing is indicated in Fig. 4, the difference being, however, in the shape of the disks of which the contact-wheels are formed, the disks P', of which the traveler in Fig. 4 is composed, being formed and arranged to constitute when assembled a number of grooved contact-wheels adapted to travel upon the round conductor 5 there shown. In all other respects the travelers, Figs. 4, 5, and 6, are the same.

I do not confine myself to the use of metallic contact devices, and the shoes or rubbing-blocks $m$ $m'$ may be formed of carbon with excellent results. Such an arrangement is indicated in Fig. 18, where, as seen, a traveling contact comprising a supporting-plate $M^2$ of conducting metal is formed with a groove along its under side within which are secured shoes $m^3$, of carbon, which are suitably beveled along their under sides to conform to the shape of the V-shaped conductor 4 shown. The conductors of whatever form are made into sections and united by slip-joints to prevent buckling or other injury from expansion and contraction with change of temperature.

As seen in Figs. 25 and 26, the flat conductors 1 1 are desirably slightly beveled at their edges, a portion of the extremity of two sections united by being slipped into a clamp or coupling which envelops the conductor on three sides, leaving the upper side perfectly free. The couplings Q are secured at the bottom of the groove $a$ by suitable screws and at desired intervals. A space being left between the united ends of the respective sections of conductor, expansion and contraction may take place without any injury or inconvenience. The sections of the slitted cylindric conductor 2 are joined, as indicated in Figs. 22 and 23, by being inserted in similarly-slitted sleeves Q', which sleeves are themselves secured to the supporting-lining by screws Q², if said support be of wood or similar material. The screws, however, should be omitted when the conductor is supported, as indicated in Fig. 19.

As indicated in Fig. 23, the extremities of the sections of conductor 2 should be reduced in thickness from the inside, so as to produce smooth flaring edges in order to prevent any possibility of the traveling contact devices catching in the space between the ends of the sections of conductor.

Fig. 24 illustrates means for uniting sections of tubular conductor 3, which is accomplished by slipping them over the extremities of metallic arms $q$, which extend from a central metallic post R of the same external diameter as the sections of conductor and firmly secured within the conduit by suitable means—as, for example, a screw $r$. The arms $q$ are slitted and forced apart, so that when compressed the sections of conductor slipped into position upon said arms will be outwardly spring-pressed against the interior of the tubular conductor, thus securing good electrical contact. The arms $q$ are of sufficient length to permit the expansion and contraction of the conductor supported thereon.

The exterior metallic casing of my improved conduit, of whatever shape and whether composed of one part or several, as hereinbefore described, is also formed in sections, which should be provided with water-tight joints, which will at the same time permit expansion and contraction between the united sections. A number of the chairs B³ will be required to properly sustain each section of conduit under the heavy loads carried by the vehicles passing along an ordinary street, and said chairs may be of any of the constructions shown in connection with the different forms; but at the points where the sections are united I provide chairs B⁴, which, instead of merely enveloping the conduit-casing closely upon all except the upper side, are formed with a shallow cavity S, extending around on the inside of the middle portion, the extremities T of the interior portion of said chairs fitting the exterior of the metallic casing as closely as is consistent with convenience in inserting the ends of the section of casing to be united. The ends of the sections to be united are placed together in a chair B⁴, sufficient space being left between them to allow for expansion. A strip of canvas or other fabric is desirably placed around the casing to cover the space between its extremities, after which the cavity S in the chair B⁴ is filled with a semi-plastic insulating material, as, for example, bitumen mixed with ashes or some substance which will prevent its becoming hard and brittle. A gasket of soft rubber would answer this purpose extremely well and is desirable where not too expensive.

As hereinbefore described, the slot of my improved conduit is so tightly closed that removal or insertion of the traveling contact devices is impossible except at points where special provision is made therefor. At such points I provide elongated chairs B⁵, one of which is indicated in Fig. 21. Wherever the chairs B⁵ are placed the lining of the conduit may be partially cut away to enlarge the groove $a$ for a distance of, say, two or three feet, according to the length of the chair B⁵. Short capping-plates B⁶ and corresponding sections of packing-strips are also provided, which, being readily removable, will, when desired, afford an opening to the conduit through which the traveling contact can be inserted or removed. Chairs B⁵ with removable surface-plates will be placed at desired intervals along the line of the conduit, so that in case of necessity the traveling contact may be removable whenever necessary.

Having described my invention, what I claim, and desire to secure by Letters Patent, is—

1. A closed slotted conduit comprising a slotted exterior casing inclosing an electric conductor, and elastic cushions fitting in the slot and normally in contact to close the slot.

2. A conduit for electric conductors, comprising a slotted exterior casing, flexible or yielding slot-closing strips normally in contact to close the conduit, insulating-supports within the conduit, and an electric conductor thereon, substantially as described.

3. A slotted conduit for electric conductors, comprising an exterior slotted casing having an insulating-lining, an electric conductor within the lining, elastic cushions for closing the slot, and a thin traveling contact device extending upward from the conductor and acting to forcibly separate the elastic cushions during its passage.

4. A slotted conduit for electric conductors, comprising an exterior casing, an interior insulating lining or support, an electric conductor or conductors upon said support, flexible or yielding insulating slot-closing strips located between the edges of the casing and the interior insulation, and a thin traveling contact device extending upwardly from the conductor and acting to forcibly separate the slot-closing strips during its passage, substantially as described.

5. A slotted conduit for electric conductors, comprising a protective casing, an insulating-lining therefor, an electric conductor supported within the insulating-lining, surface or capping plates forming a part of the casing, and continuous flexible strips of insulating material between the surface-plates and the insulating-lining for insulating the said lining from the surface-plates and closing the conduit, substantially as described.

6. A conduit for electric conductors, comprising a slotted exterior casing, flexible insulating slot-closing strips normally in contact to close the conduit, insulating-supports within the conduit and an electric conductor thereon, a traveling contact device engaging the conductor and comprising rubbing-surfaces, and a thin metallic plate extending upward between the adjacent edges of the slot-closing strips, whereby the said conducting-plate is insulated from the edges of the metallic casing, substantially as described.

7. A closed conduit comprising a slotted protective casing, an interior lining or filling of solid insulating material formed with a continuous groove or channel therein, a main supply-conductor supported in said channel, and flexible insulating-strips located below the edges of the slot in the casing and having their edges held normally in close contact by the edges of the said metallic casing, substantially as described.

8. A conduit for electric conductors, comprising a slotted exterior casing, flexible or yielding slot-closing strips of fibrous material normally in contact to close the conduit, insulating-supports within the conduit, and an electric conductor or conductors thereon, substantially as described.

9. A contact device for slotted conduits, provided with non-conducting slot-closing packing comprising an elongated bare metallic conductor provided at its lower portion with contact devices for engaging the conductor or conductors within the conduit and connections secured to the portion of the contact device exterior to the conduit for propelling it therealong.

10. A conduit for electric railways, having an insulating conductor-supporting body, and a metallic exterior protective casing composed of metallic bars or pieces inclosing the conductor-supporting body and forming a slotted exterior casing therefor, and suitable chairs adapted to receive and to unite the conductor-supporting body and casing.

11. A conduit for electric railways, having an insulated conductor-supporting body, a metallic exterior casing composed of two trough-shaped metallic parts inclosing the said body from opposite sides and forming a slotted exterior casing therefor, and suitable chairs for receiving and holding the body and its protective casing.

12. A closed slotted conduit for electric railways, having an insulated conductor-supporting body formed with a groove therein to receive the conductor, flexible strips of non-conducting material attached to the conductor-supporting body and arranged to close the conductor-containing groove therein, metallic troughs fitted sidewise upon the conductor-supporting body to inclose the same and form a slotted exterior casing therefor and hold the grooved closing-packing in position, and suitable chairs for receiving and sustaining the conductor-supporting body and its protective casing, substantially as described.

In testimony whereof I hereto affix my signature in presence of two witnesses.

CHARLES J. VAN DEPOELE.

Witnesses:
J. W. GIBBONEY,
E. D. PRIEST.